United States Patent
Ogawa

(10) Patent No.: US 8,827,214 B2
(45) Date of Patent: Sep. 9, 2014

(54) CLAMP

(75) Inventor: Takaya Ogawa, Toyota (JP)

(73) Assignee: Nifco Inc., Yokohama-shi (JP)

( * ) Notice: Subject to any disclaimer, the term of this patent is extended or adjusted under 35 U.S.C. 154(b) by 102 days.

(21) Appl. No.: 13/574,507

(22) PCT Filed: Jan. 26, 2011

(86) PCT No.: PCT/JP2011/051401
§ 371 (c)(1),
(2), (4) Date: Aug. 28, 2012

(87) PCT Pub. No.: WO2011/093299
PCT Pub. Date: Aug. 4, 2011

(65) Prior Publication Data
US 2013/0001373 A1    Jan. 3, 2013

(30) Foreign Application Priority Data
Jan. 27, 2010    (JP) ................. 2010-015265

(51) Int. Cl.
| | |
|---|---|
| *F16L 3/08* | (2006.01) |
| *F16B 21/08* | (2006.01) |
| *B60R 16/02* | (2006.01) |
| *F16L 3/10* | (2006.01) |
| *F16L 55/035* | (2006.01) |

(52) U.S. Cl.
CPC ............. *F16L 55/035* (2013.01); *F16B 21/088* (2013.01); *B60R 16/0215* (2013.01); *F16L 3/1075* (2013.01); *F16L 3/1041* (2013.01)
USPC ......... 248/74.1; 248/74.3; 248/74.4; 285/419

(58) Field of Classification Search
USPC ................. 248/65, 74.1, 74.3, 74.4, 68.1, 73; 285/419; 138/110
See application file for complete search history.

(56) References Cited

U.S. PATENT DOCUMENTS

| | | | | |
|---|---|---|---|---|
| 5,257,768 | A | * | 11/1993 | Juenemann et al. .......... 248/604 |
| 5,620,210 | A | * | 4/1997 | Eyster et al. ................... 285/81 |

(Continued)

FOREIGN PATENT DOCUMENTS

| | | |
|---|---|---|
| CN | 1475689 A | 2/2004 |
| GB | 2288205 A * | 11/1995 .............. E21B 17/01 |

(Continued)

OTHER PUBLICATIONS

China Patent Office, "Office Action for CN 201180007255.5," Dec. 3, 2013.

*Primary Examiner* — Terrell McKinnon
*Assistant Examiner* — Daniel Breslin
(74) *Attorney, Agent, or Firm* — Manabu Kanesaka

(57) ABSTRACT

A clamp is provided, which includes a clamp main body including a plurality of concave members forming a cylindrical body by combining together, and a fixing device provided in any of the plurality of concave members for fixing the clamp to an attachment object; and an approximately arc-like buffer member disposed on an inner circumferential side of the concave member. On one side surface facing the concave member in the buffer member, a leg portion is formed to bulge out, and on another side surface opposite to the one side surface in the buffer member, an approximately concave-like holding surface is provided. Such clamp can hold long bodies with various diameters, and also can attenuate vibrations of the long bodies.

9 Claims, 6 Drawing Sheets

(56) References Cited

U.S. PATENT DOCUMENTS

| | | | |
|---|---|---|---|
| 6,164,604 A * | 12/2000 | Cirino et al. | 248/74.3 |
| 6,732,764 B2 * | 5/2004 | Miyamoto et al. | 138/110 |
| 6,908,123 B2 * | 6/2005 | Le | 285/402 |
| 6,913,294 B2 * | 7/2005 | Treverton et al. | 285/406 |
| 7,175,138 B2 * | 2/2007 | Low et al. | 248/68.1 |
| 7,278,190 B2 * | 10/2007 | Fischer et al. | 24/530 |
| 7,887,012 B2 * | 2/2011 | Desai et al. | 248/55 |
| 8,020,812 B2 * | 9/2011 | Matsuno et al. | 248/71 |
| 8,366,059 B2 * | 2/2013 | Fannon et al. | 248/74.3 |
| 2007/0215757 A1 | 9/2007 | Yuta | |
| 2007/0246614 A1 * | 10/2007 | Allmann et al. | 248/65 |
| 2008/0245933 A1 * | 10/2008 | Stokes | 248/74.1 |
| 2010/0219301 A1 * | 9/2010 | Sampson | 248/74.1 |
| 2012/0298811 A1 * | 11/2012 | Ogawa et al. | 248/74.3 |
| 2012/0318935 A1 * | 12/2012 | Benedetti | 248/74.1 |
| 2013/0221185 A1 * | 8/2013 | Ogawa | 248/634 |

FOREIGN PATENT DOCUMENTS

| | | | | |
|---|---|---|---|---|
| JP | H05-215276 | 8/1993 | | |
| JP | H08-145241 | 6/1996 | | |
| JP | H11-013942 | 1/1999 | | |
| JP | 2000-002364 | 1/2000 | | |
| JP | 2000002364 A | * | 1/2000 | F16L 3/12 |
| JP | 2001-099357 | 4/2001 | | |
| JP | 2005-172229 | 6/2005 | | |

* cited by examiner

CLAMP

FIELD OF TECHNOLOGY

The present invention relates to a clamp being capable of fixing a tube body such as a long pipe, tube, and the like, or a rod-like member such as a rod, a wire, and the like in a state of holding them.

BACKGROUND ART

For example, a conventional clamp includes a clamp main body, an article receiving body having a semicircular concave shape, and a clip device holding the pipe and the like from a top of the concave shape, which are integrally formed by synthetic resin and the like. Then, the concave shape of the article receiving body has a diameter approximately equal to that of the tube body such as the long pipe, tube, and the like in which the article receiving body holds. In response to the diameter of the pipe and the like which will be used, the concave shape of the article receiving body has been also changed. Also, although the clip device has flexibility, there has been almost no flexible part between the clamp main body and the article receiving body having the concave shape.

PRIOR ART DOCUMENT

Patent Document

Patent Document 1: Japanese Unexamined Patent Publication No. 2005-172229
Patent Document 2: Japanese Unexamined Patent Publication No. 2001-99357

SUMMARY OF THE INVENTION

Problems to be Solved by the Invention

The conventional clamp has disadvantages of a bad workability when a soft member is attached to a hard member, and additionally, of a low productivity. Also, there is almost no flexible in the soft member for suppressing a vibration of the tube body and the like in which the conventional clamp holds so as to be incapable of obtaining a sufficient vibration suppression effect. Furthermore, since the conventional clamp is designed in conformity to the diameter of a predetermined tube body, it is almost impossible to divert the conventional clamp to other tube diameters.

Means for Solving the Problems (1) A clamp of the present invention has an object to solve the aforementioned problems, and has a characteristic in that the clamp comprises a clamp main body including a plurality of concave members forming a cylindrical body by combining together, and a fixing device provided in any of the plurality of concave members for fixing the clamp to an attachment object; and an approximately arc-like buffer member disposed on an inner circumferential side of the concave member. Also, the clamp of the present invention has a characteristic in that on one side surface facing the concave member in the buffer member, a leg portion is formed to bulge out, and on another side opposite to the aforementioned side surface in the buffer member, an approximately concave-like holding surface is provided.

According to the clamp of the present invention, the cylindrical body is formed by combining the plurality of concave members wherein the arc-like buffer member is disposed detachably on the inner circumferential side, so that a tube body can be held by the buffer member. Then, the clamp of the present invention can hold and fix the tube body with a different diameter provided that a diameter of the tube body is within a predetermined acceptable range, and also can attenuate a vibration of the tube body.

(2) Also, in the clamp having the characteristic described in (1), preferably, the buffer member includes an attaching-and-detaching projection formed to protrude from an outside bottom portion of the leg portion, and by inserting the attaching-and-detaching projection to pass through an attachment hole formed in the concave member from the inner circumferential side of the concave member, the buffer member is fixed to the concave member.

(3) Also, in the clamp described in (1) or (2), preferably, the buffer member includes a plurality of projections provided to stand from the leg portion toward a side opposite to the concave member, and the projections protrude from an imaginary inner circumferential surface of the approximately concave-like holding surface.

(4) Also, in the clamp described in any of (1) to (3), preferably, the buffer member contacts with the concave member of the clamp main body through the leg portion formed in the center in a width direction.

(5) Also, in the clamp described in any of (1) to (4), preferably, a plurality of buffer members is provided, and is respectively formed in the same shape.

(6) Also, in the clamp described in any of (1) to (5), preferably, an opening is provided in the holding surface of the buffer member, and the projections are provided to stand from a bottom portion of a depressed portion depressed on a side of the concave members from the opening.

BEST MODES OF CARRYING OUT THE INVENTION

Figure 1:
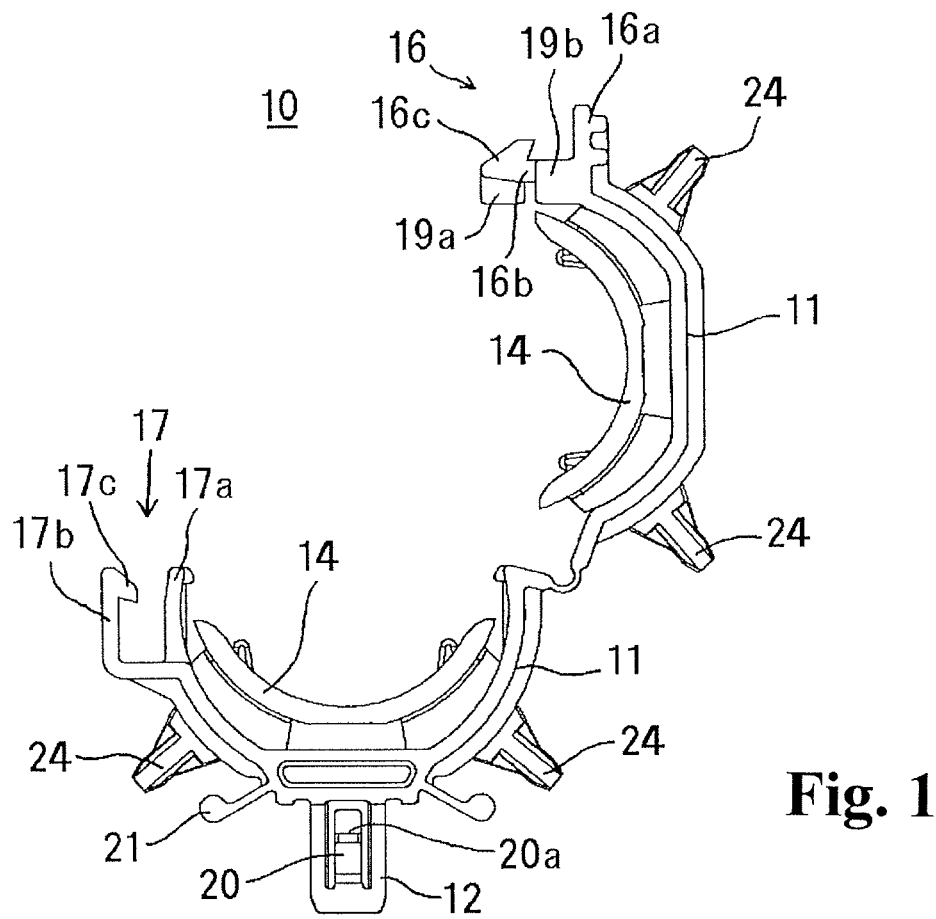
FIG. 1 is a front view showing a state wherein a clamp 10 according to an embodiment of the present invention is open.
Figure 2:
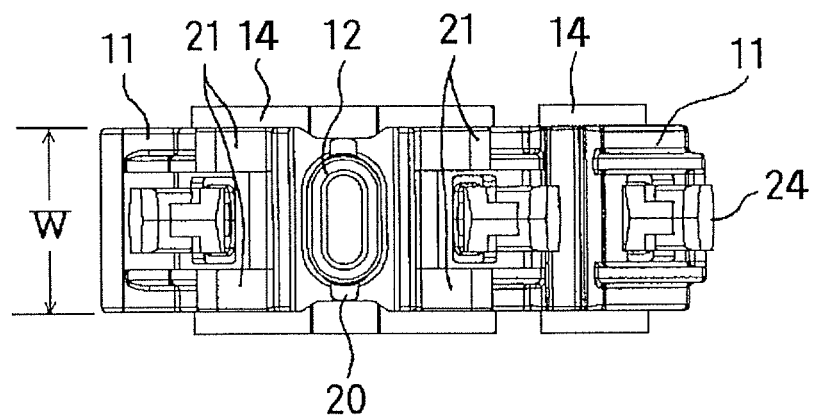
FIG. 2 is a bottom view showing the state wherein the clamp 10 is open.
Figure 3:
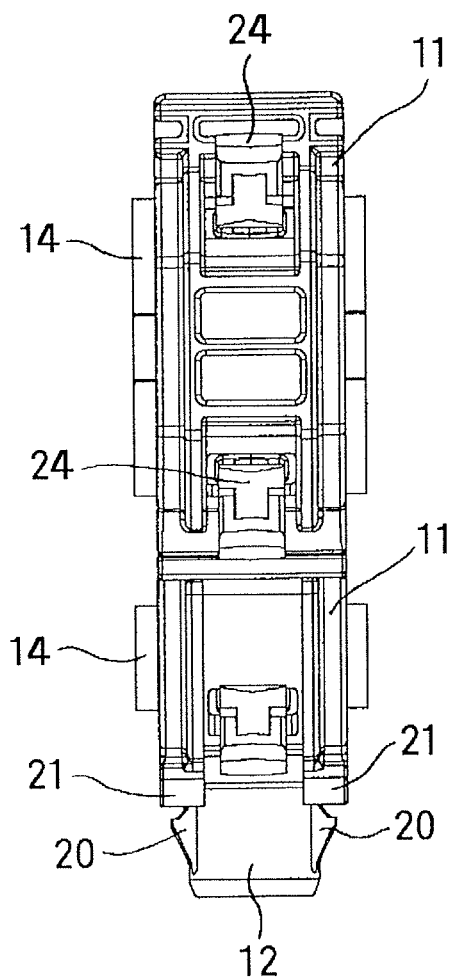
FIG. 3 is a side view showing the state wherein the clamp 10 is open.
Figure 4:
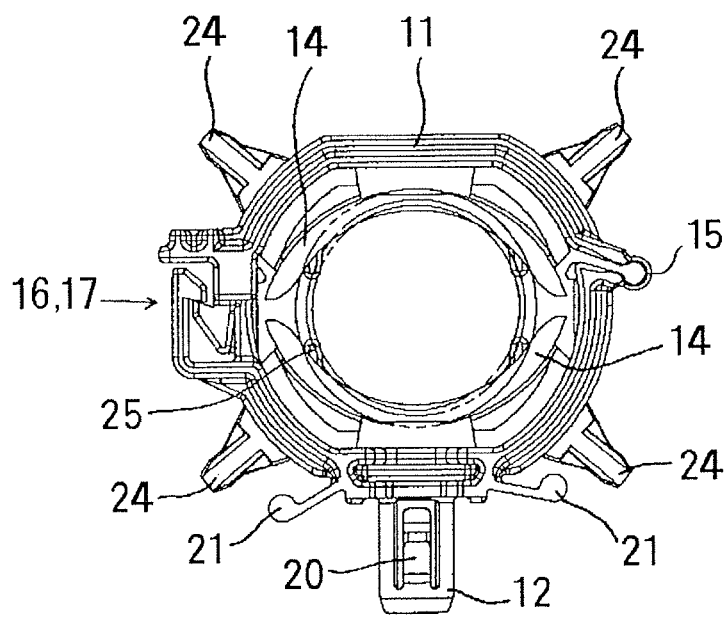
FIG. 4 is a front view showing a state wherein the clamp 10 is closed.
Figure 5:
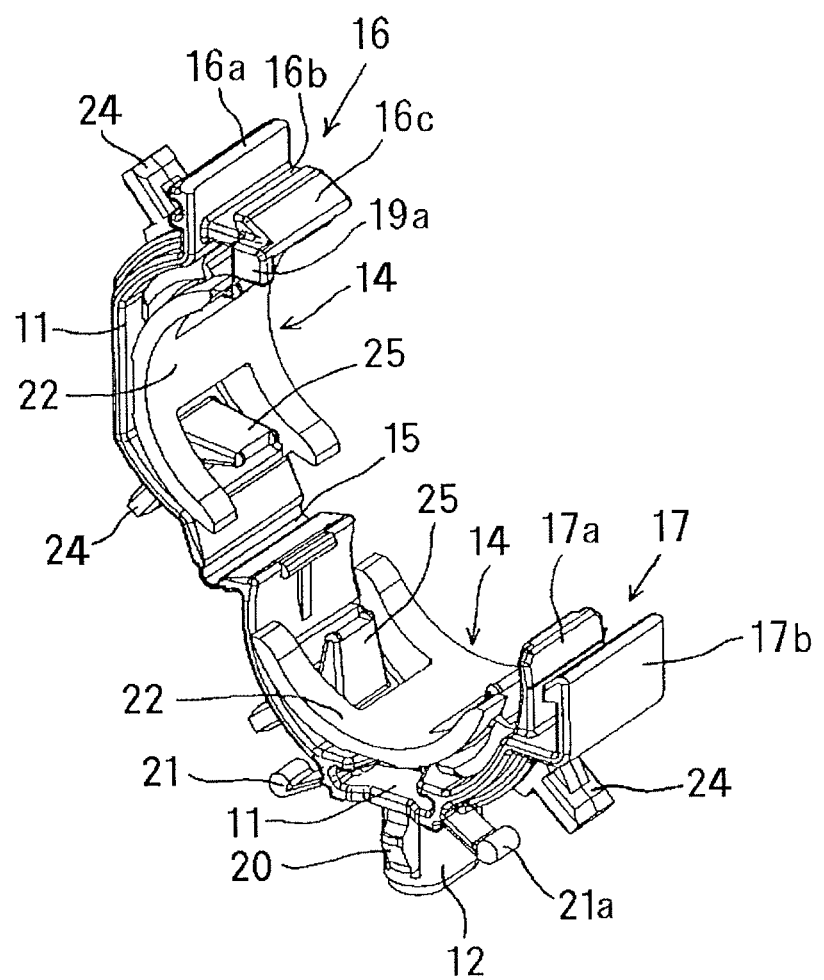
FIG. 5 is a perspective view showing the state wherein the clamp 10 is open.
Figure 6:
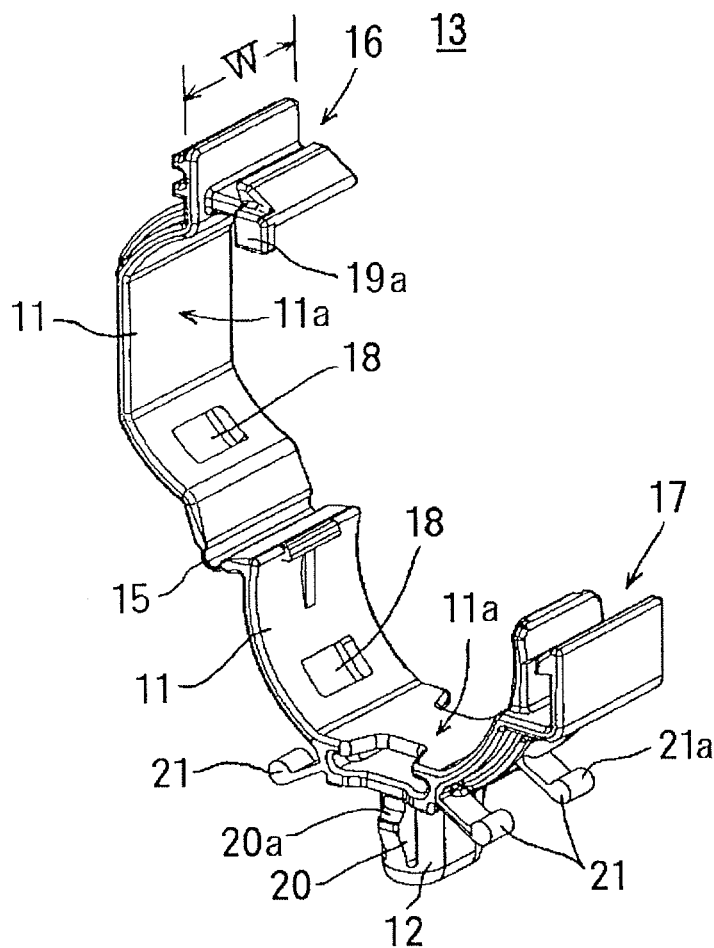
FIG. 6 is an expanded perspective view of a clamp main body 13.

Hereinafter, embodiments of the present invention will be explained in detail with reference to drawings. FIG. 1 is a front view showing a state wherein a clamp 10 according to the embodiment of the present invention is open. Also, FIG. 2 is a bottom view showing the state wherein the clamp 10 is open. Also, FIG. 3 is a side view showing the state wherein the clamp is open. Also, FIG. 4 is a front view showing a state wherein the clamp 10 is closed. Also, FIG. 5 is a perspective view showing the state wherein the clamp 10 is open. Also, FIG. 6 is an expanded perspective view of a clamp main body 13. Also, FIG. 7 is a cross-sectional view of the clamp main body 13.

The clamp 10 according to the embodiment of the present invention is structured by the clamp main body 13 including two concave members 11 which form a cylindrical body by combining together; a fixing device 12 provided in one concave member 11 for fixing the clamp 10 to an attachment object such as, for example, a vehicle and the like; and approximately arc-like buffer members 14 respectively disposed detachably on inner circumferential sides 11a of the concave members 11.

Figure 7:
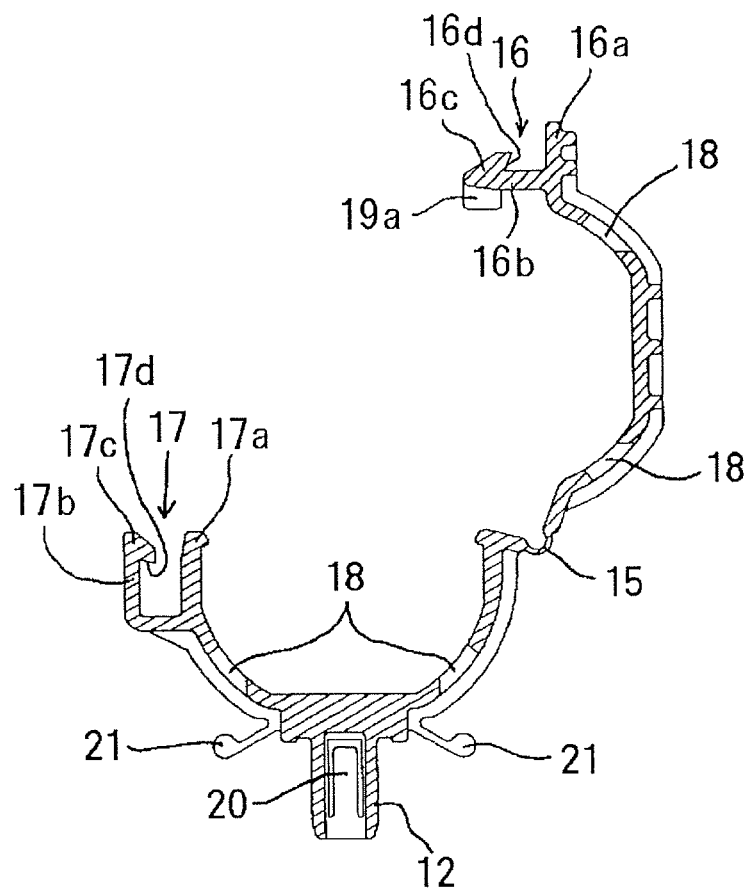
FIG. 7 is a cross-sectional view of the clamp main body 13.

As shown in FIGS. 6 and 7, the clamp main body 13 comprises two pieces of the concave members 11 whose one end is connected by a hinge 15, and engaging devices 16 and 17 provided on the other end of the respective concave members 11. Also, in the hinge 15, hard resin is formed in a thin-walled and curved-surface shape, and is structured so as to increase a flexibility. The concave members 11 are formed by hard synthetic resin such as, for example, polyacetal resin (POM), polyamide resin (PA), and the like, and there is formed a pair of attachment holes 18 and 18 passing through for attaching the buffer members 14. The attachment holes 18 are provided in the center of a width size W of the concave members 11. In a portion clamped by a pair of attachment holes 18 in the respective inner circumferential sides 11a of the two concave members 11, there is provided an approximately flat planar portion.

As shown in FIGS. 1 to 7, the engaging device 16 is provided in an end portion on a side opposite to the hinge 15 in one of the two concave members 11, and includes a base end portion 16a, and an engaging piece 16b which is provided to stand from the base end portion, and can elastically deform. In a top portion of the engaging piece 16b, there is formed an engaging projection 16c whose cross-sectional surface has an approximately triangular shape. The base end portion 16a and the engaging piece 16b are formed to be approximately equal to the width size W of the concave members 11. Also, in an end portion in a width direction of the engaging piece 16b, there are formed lateral misalignment preventing projections 19a and 19b. When the two concave members 11 are combined, the lateral misalignment preventing projections 19a and 19b abut against an end portion of a guide piece 17a of the engaging device 17 provided in the end portion of the other concave member 11 so as to prevent a portion engaged by the engaging devices 16 and in the two concave members 11 from being misaligned in a lateral direction (the width direction).

The engaging device 17 is provided in the end portion on the side opposite to the hinge 15 in the other of the two concave members 11, and includes the guide piece 17a and an elastically deformable engaging piece 17b which are provided to project approximately in a parallel manner with a predetermined interval. In a top portion of the engaging piece 17b, there is formed an engaging projection 17c whose cross-sectional surface has the approximately triangular shape. When the engaging projection 16c and the engaging projection 17c are engaged by rotating the two concave members 11 at the center of the hinge 15, an engaging step portion 16d of the engaging projection 16c and an engaging step portion 17d of the engaging projection 17c mutually abut.

The fixing device 12 is attached to one of the two concave members 11. The fixing device 12 has a cylinder body whose cross-sectional surface has an oval shape, and engaging pieces 20 are formed on both ends in the width direction by cutting and rising. Also, the engaging pieces 20 can elastically deform, and include engaging step portions 20a on an outside, and one portion protrudes from an outer circumferential surface of the cylinder body of the fixing device 12.

Also, a plurality of abutting pieces 21 is provided to stand from a circumference of the fixing device 12 in the concave member 11 wherein the fixing device 12 is attached. The abutting pieces 21 are provided to obliquely extend from an outer circumference of a flat portion clamped by a pair of the attachment holes 18 of the concave members 11, and ends of the abutting pieces 21 include columnar portions 21a. Therefore, even if an abutting angle of the abutting pieces 21 changes, the abutting pieces 21 always abut against the attachment object of the clamp 10 on one portion of a circle.

Figure 8:
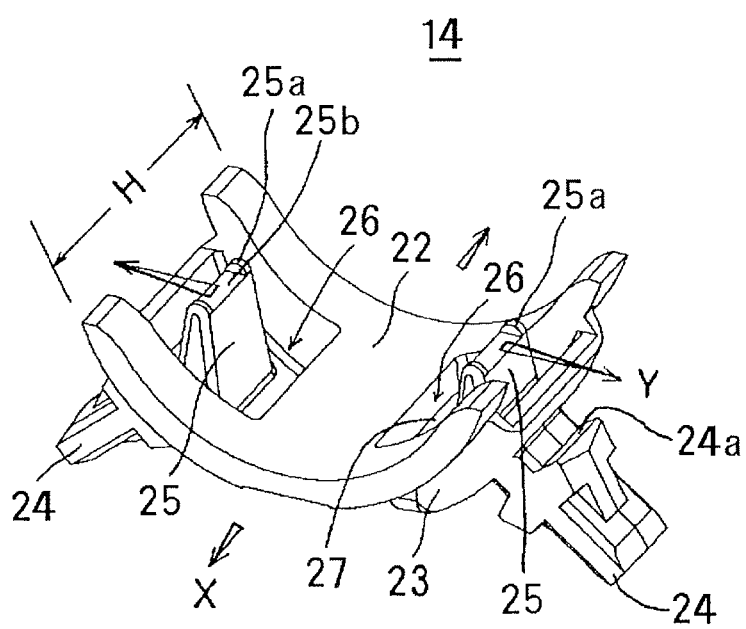
FIG. 8 is an expanded perspective view of buffer members 14.
Figure 9:
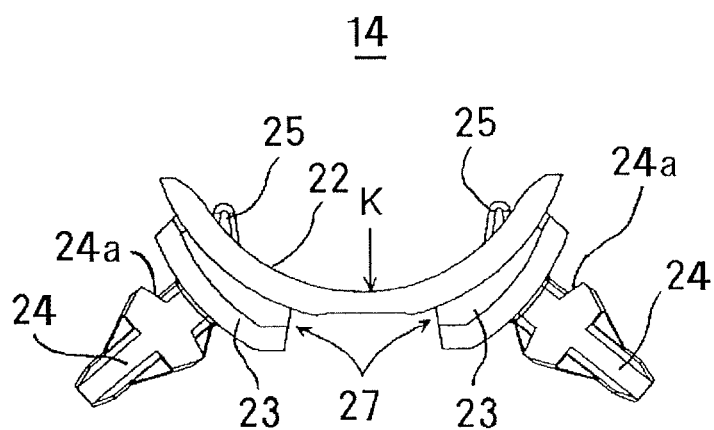
FIG. 9 is a front view of the buffer members 14.
Figure 10:
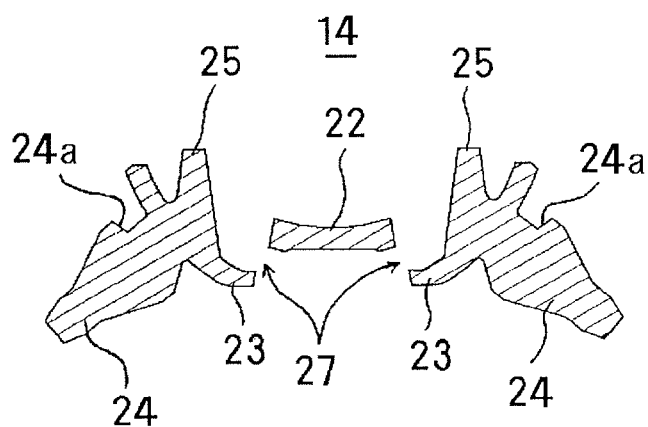
FIG. 10 is a vertical cross-sectional view of the buffer members 14.

FIG. 8 is an expanded perspective view of the buffer members 14. Also, FIG. 9 is a front view of the buffer members 14. Also, FIG. 10 is a vertical cross-sectional view of the buffer members 14.

The buffer members 14 are formed by soft synthetic resin such as, for example, thermoplastic elastomer (TPE), olefinic elastomer (TPO), and the like, and are formed in an approximately arc shape as a whole. The buffer members 14 are provided to respectively correspond to the two concave members 11, and are disposed on the inner circumferential sides 11a of the respective concave members 11 detachably from the concave members 11. Also, inside (sides opposite to the sides facing the concave members 11) the buffer members 14, there are provided approximately concave-like holding surfaces 22. Also, on surfaces on the sides facing the concave members 11 in the buffer members 14, there are formed to bulge out leg portions 23. Also, the buffer members 14 include attaching-and-detaching projections 24 formed to protrude outwardly from outside bottom portions of the leg portions 23.

Also, the buffer members 14 include a pair of projections 25 provided to stand toward the sides opposite to the concave members 11 from inner bottom surfaces of the leg portions 23 toward inner circumferential sides of the holding surfaces 22. The projections 25 are formed to protrude from imaginary inner circumferential surfaces (a surface shown by assigning a symbol "K" in FIG. 9) of the approximately concave-like holding surfaces 22. Therefore, when a long body such as a pipe and the like is held by the clamp 10, the projections 25 and the holding surfaces 22 of the buffer members 14 abut against the long body with two phases so as to be capable of reliably holding the long bodies with various diameters. Moreover, ends of the projections 25 are formed such that both ends 25a are formed in an arc shape, and also that central portions 25b are flatly formed lower than both ends 25a. Also, in the holding surfaces 22 of the buffer members 14, there are provided openings, and the projections 25 are provided to stand from bottom portions inside depressed portions 26 depressed on sides of the concave members 11 from the openings. Also, the buffer members 14 contact with the concave members 11 of the clamp main body 13 through the leg portions 23 formed in the center in a width H direction, so that the buffer members 14 can deform corresponding to not only a deflection in a radial direction of the long body such as the pipe and the like, but also deflections in an arrow X direction and an arrow Y direction shown in FIG. 8. Incidentally, in the clamp 10, the buffer members 14 attached to the respective two concave members 11 are respectively formed in the same shape.

The depressed portions 26 formed in the buffer members 14 include notches 27 between the depressed portions 26 and the holding surfaces 22 so as to make it harder to mutually contact the buffer members 14 and the projections 25 when the buffer members 14 and the projections 25 deflect. The attaching-and-detaching projections 24 are formed in an approximately wedge shape as a whole, and include engaging step portions 24*a* in a predetermined position from outside bottom surfaces of the leg portions 23. Also, the attaching-and-detaching projections 24 have a size which can be easily gripped by one's fingers at an assembly time.

Next, an assembly procedure of the clamp 10 will be explained. First, the clamp main body 13 is molded by hard resin, and the buffer members 14 are molded by soft resin with separate molds, respectively. The buffer members 14 are attached to the concave members 11 of the clamp main body 13. At that time, the attaching-and-detaching projections 24 of the buffer members 14 are inserted to pass through the attachment holes 18 formed in the concave members 11. The attaching-and-detaching projections 24 molded by the soft resin easily deform, and are pulled out of the attachment holes 18, and the engaging step portions 24*a* are engaged with and fixed to outer circumferential walls of the concave members 11. Also, the attaching-and-detaching projections 24 have the size which can be easily gripped by one's fingers, so that an assembly operation of the buffer members 14 into the concave members 11 is easy. Two pieces of the buffer members 14 are used relative to one piece of the clamp main body 13, and also regarding the buffer members 14, the same shape can be used so as to be capable of reducing the number of components.

Next, by using the clamp 10 structured as mentioned above, a case wherein a tube body such as a long pipe, a tube, and the like is disposed inside an engine compartment of an automobile, will be explained. First, the fixing device 12 of the clamp 10 is directly attached by insertion to an attachment hole formed in the vehicle and not shown in the figures. When the fixing device 12 is attached by insertion to the attachment hole, after the engaging pieces 20 elastically deform and move backward once, the engaging pieces 20 move forward again, and the engaging step portions 20*a* engage with a thickness portion of the vehicle, so that the clamp 10 is fixed to the vehicle. Also, the columnar portions 21*a* of the ends of the abutting pieces 21 formed around the fixing device 12 abut against a wall surface of the vehicle, so that the abutting pieces 21 can hold a posture of the clamp 10. Namely, since the abutting pieces 21 elastically deform, even in a case where the pipe and the like which has been held vibrates, a holding state of the clamp 10 itself cannot become unstable.

After the clamp 10 is fixed, the pipe and the like are placed on the holding surfaces 22 of the opened buffer members 14, and then the concave members 11 are closed so as to lock the engaging devices 16 and 17. The engaging projection 16*c* of the engaging device 16 is inserted between the engaging projection 17*c* and the guide piece 17*a* of the engaging device 17 so as to engage with the engaging projection 17*c*. Then, as shown in FIG. 4, two pieces of the concave members 11 and 11 are combined and structure the cylindrical body, and also the holding surfaces 22 of the buffer members 14 are oppositely disposed so as to hold the pipe as well. At that time, the projections 25 and the holding surfaces 22 respectively abut against a pipe surface independently, to thereby f increase an acceptable range of a pipe diameter to be held. For example, the pipe diameter can correspond to 15.9 φ, 19 φ, 22 φ, and the like. Also, only by changing a size and a shape of the buffer members 14 without changing the clamp main body 13, the clamp 10 can correspond to the various pipe diameters.

Moreover, in the clamp 10 according to the present embodiment, in a case wherein the fixed pipe vibrates due to a vibration of the automobile and the like, since the pipe is held by four pieces of the elastically deformable projections and two pieces of the buffer members 14, the generated vibration can be effectively attenuated. Also, since the projections 25 are provided to stand from the inner bottom surfaces of the depressed portions of the leg portions 23 formed to bulge out, at a time of deformation, it is difficult to be affected by the deformation of the buffer members 14. Therefore, based on an elastic coefficient in which the projections 25 and the buffer members 14 differ, the projections 25 can correspond to a different vibration property. The buffer members 14 molded by the soft resin are attached by insertion to the concave members (the clamp main body 13) through the leg portions 23 so as to be capable of increasing a deformation range, and of improving an attenuation performance. Also, the leg portions 23 are provided in the center in the width H direction of the buffer members 14, so that the buffer members 14 allow the pipe held by the buffer members 14 to move in a pitching direction or a yawing direction. Therefore, the acceptable range wherein the tube body such as the long pipe, the tube, and the like holds, expands. Also, as shown in FIG. 8, a soft material can exert the flexibility more by bending than by compressing so as to be capable of improving the acceptable range of a tube diameter by using a bending deformation, and also a vibration suppression effect improves.

Also, in the engaging devices 16 and 17, when the engaging piece 16*b* and the engaging piece 17*b* are engaged, a movement in the lateral (width) direction is blocked by the lateral misalignment preventing projections 19*a* and 19*b*, so that once the engaging piece 16*b* and the engaging piece 17*b* are locked, they cannot come off, and there is no possibility that the pipe and the like will drop while the automobile is moving. Moreover, in the ends of the projections 25, both ends 25*a* are formed in the arc shape, and also the central portions 25*b* are flatly formed lower than both ends 25*a* so as to increase an abutting property against the pipe and the like.

Thus, according to the clamp 10 with respect to the embodiment of the present invention, the clamp 10 is formed by the clamp main body 13 which forms the cylindrical body by combining the concave members 11, and also comprises the fixing device for fixing the clamp to any of the concave members 11; and the approximately arc-like buffer members 14 disposed on the inner circumferential sides of the concave members 11. The buffer members 14 include the holding surfaces 22 structured in an approximately concave shape, and are provided with the leg portions 23 formed to bulge out on side surfaces facing the concave members 11. Also, the long body is held by the buffer members 14 disposed on an inner circumference of the concave members 11 structuring the cylindrical body, so that the buffer members 14 can reliably hold even the long body with a different diameter, and there is no possibility that the long body will drop.

Also, the buffer members 14 include the attaching-and-detaching projections 24 which can protrude from the attachment holes 18 formed in the concave members 11. Also, the attaching-and-detaching projections 24 are formed to protrude from the outside bottom portions of the leg portions 23 formed to bulge out, so that when the clamp main body 13 and the buffer members 14 are assembled, an assembly process is facilitated, and also a vibration suppression performance can be improved.

Also, the buffer members comprise a plurality projections provided to stand from the leg portions 23 toward the inner circumferential sides of concaves, and the projections are formed to protrude from the imaginary inner circumferential surfaces of the holding surfaces 22, so that the projections of the buffer members 14 and the holding surfaces 22 abut against the long body such as the pipe and the like with two phases so as to be capable of corresponding to a plurality of tube diameters.

Also, the buffer members 14 contact with the concave members 11 of the clamp main body 13 through the leg portions formed in the center in the width direction so as to be capable of corresponding to not only the vibration in the radial direction of the long body such as the pipe and the like, but also the vibration in the pitching or the yawing direction.

Also, a plurality of buffer members 14, which is respectively formed in the same shape, is provided so as to be capable of reducing the number of the components.

Also, the leg portions 23 formed to bulge out include open depressed portions in the holding surfaces 22 on the inner circumferential sides, and the projections are provided to stand from the bottom surfaces of the depressed portions so as to be capable of making the deformation of the projections smooth, and of corresponding to a change of the tube diameter.

Incidentally, the long body in which the clamp 10 according to the present embodiment can hold is not limited to the pipe, and the clamp 10 can easily hold the tube body such as the tube and the like, or the rod-like member such as a rod, a wire, and the like. Also, by changing the vibration property of the buffer members 14, the buffer members 14 can correspond to various unique vibrations. The present invention is not limited to the aforementioned embodiment, and can be modified with various designs based on the description in claims. Also, in the clamp 10 according to the present embodiment, a case of comprising two concave members 11 structuring the clamp main body 13 has been explained; however, the concave members 11 may be provided with three or above.

The present application is based on Japanese Patent Application (Japanese Patent Application No. 2010-015265) filed on Jan. 27, 2010, and contents thereof are incorporated herein as a reference.

EXPLANATION OF SYMBOLS

10 a clamp
11 concave members
11a inner circumferential sides
12 a fixing device
13 a clamp main body
14 buffer members
15 a hinge
16 an engaging device
16a a base end portion
16b an engaging piece
16c an engaging projection
16d an engaging step portion
17 an engaging device
17a a guide piece
17b an engaging piece
17c an engaging projection
17d an engaging step portion
18 attachment holes
19a a lateral misalignment preventing projection
19b a lateral misalignment preventing projection
20 engaging pieces
20a engaging step portions
21 abutting pieces
21a columnar portions
22 holding surfaces
23 leg portions
24 attaching-and-detaching projections
25 projections
26 depressed portions
27 notches

What is claimed is:

1. A clamp, comprising:
a clamp main body including a plurality of concave members forming a cylindrical body by combining together, and a fixing device provided on any one of the plurality of concave members for fixing the clamp to an attachment object; and
an approximately arc-shaped buffer member disposed on an inner circumferential side of the concave member,
wherein on one side surface facing the concave member on the buffer member, a plurality of leg portions is formed to bulge out, and on another side surface opposite to the one side surface on the buffer member, an approximately concave-shaped holding surface is provided,
the buffer member comprises
a plurality of depressed portions depressed to a side of the concave member, and
a plurality of projections, each standing from each of the plurality of leg portions toward a side opposite to the concave member and protruding outwardly from each of the depressed portions, and
the plurality of projections protrudes from an imaginary inner circumferential surface of the approximately concave-shaped holding surface through a bottom portion of each of the plurality of depressed portions.

2. A clamp according to claim 1, wherein the buffer member includes a plurality of attaching-and-detaching projections each being formed to protrude from an outside bottom portion of each of the plurality of leg portion portions, and
by inserting the plurality of attaching-and-detaching projections to pass through a plurality of attachment holes formed in the concave member from the inner circumferential side of the concave member, the buffer member is fixed to the concave member.

3. A clamp according to claim 1, wherein the buffer member contacts with the concave member of the clamp main body through the plurality of leg portions formed in a center in a width direction.

4. A clamp according to claim 1, wherein the buffer member comprises the plurality of depressed portions on two end sides of the buffer member.

5. A clamp according to claim 1, wherein a tip end of each of the plurality of projections protrudes above a surface of the holding surface.

6. A clamp according to claim 1, wherein each of the plurality of projections is integrally formed with each of the plurality of leg portions.

7. A clamp according to claim 2, wherein each of the plurality of projections is integrally formed with each of the plurality of leg portions and each of the plurality of attaching-and-detaching projections.

8. A clamp according to claim 1, wherein each of the plurality of projections has end parts each having an arc shape, and a central part having a flat surface between the end parts, and
the end parts protrude from two ends of the central part.

9. A clamp according to claim 1, wherein each of the plurality of depressed portions has a notch between each of the plurality of depressed portions and the holding surface so as to make the buffer member hard to mutually contact with each of the plurality of projections when the buffer member and the plurality of projections deflect.

* * * * *